Patented Aug. 15, 1933

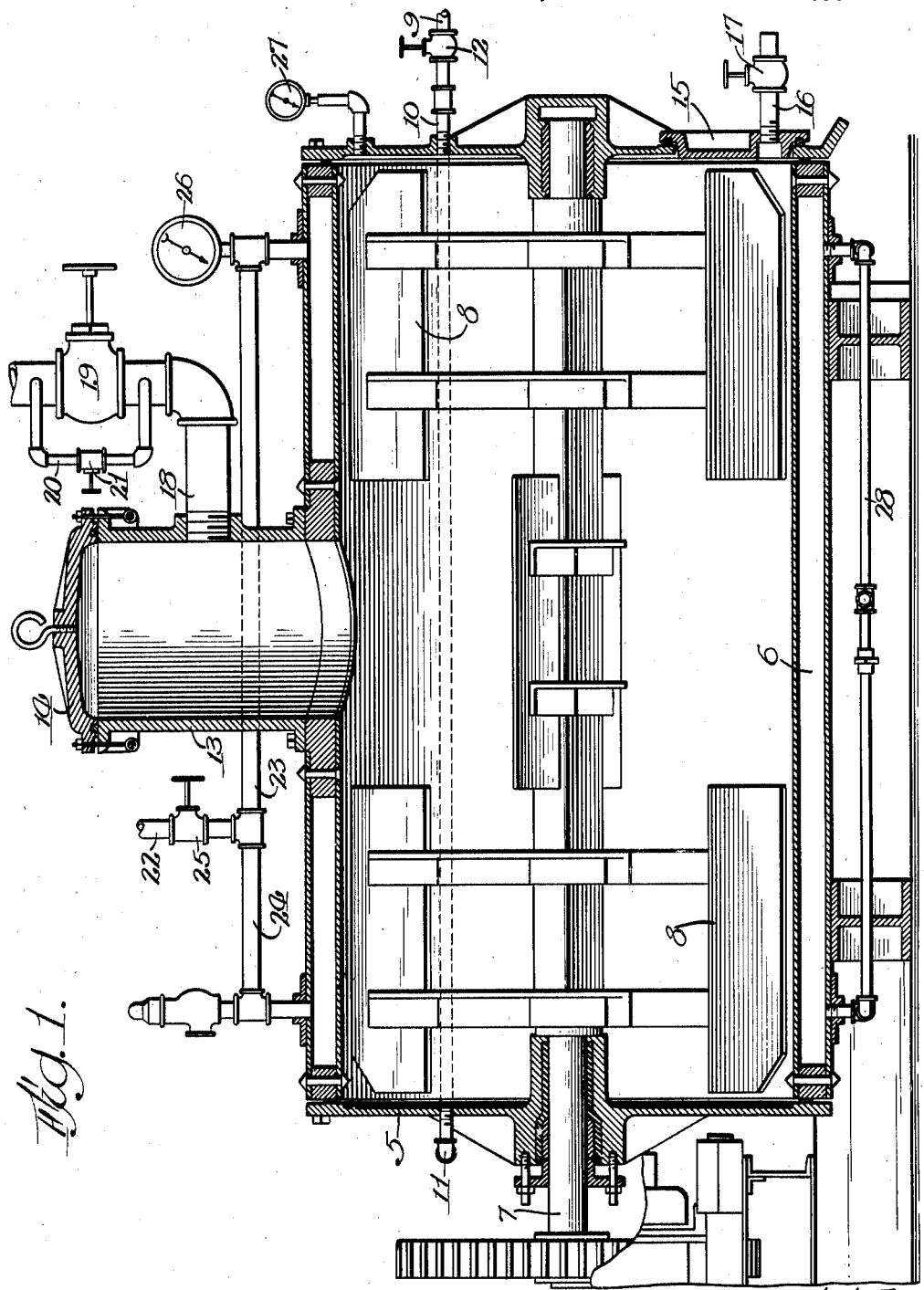

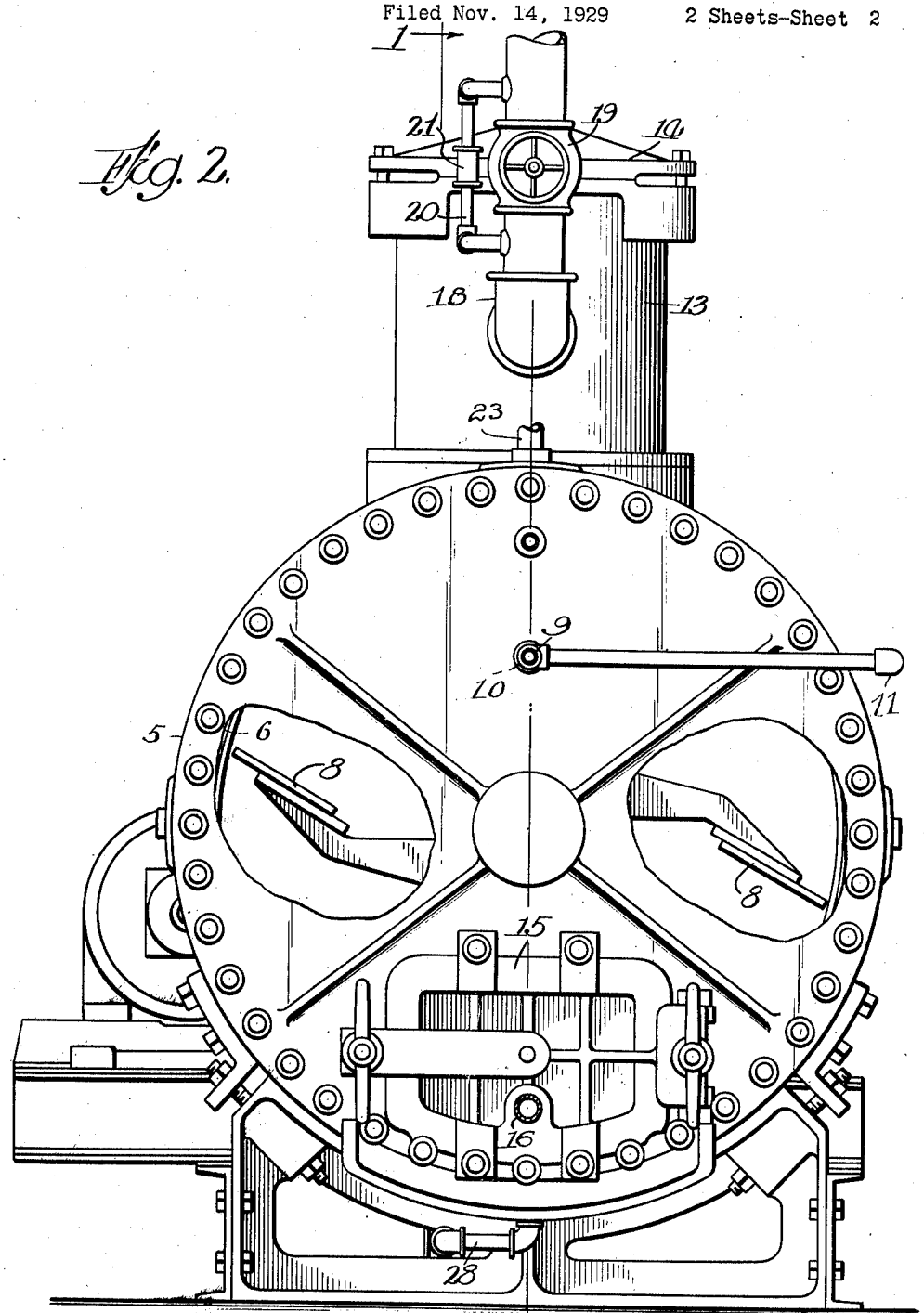

1,922,177

UNITED STATES PATENT OFFICE 1,922,177

METHOD OF COOKING AND DRYING EGGSHELLS

Carl O. Ryde, Oak Park, Ill.

Application November 14, 1929
Serial No. 407,299

6 Claims. (Cl. 99—5)

This invention relates to the preparation of egg shells for use for chicken feed and as far as I am aware constitutes a new art. In preparing eggs for storage, or other purposes, they are now often broken in large quantities and the contents removed leaving the shells as waste or by-product. When these shells are thrown together they stick to each other more or less on account of the albumen or white of the egg and shell membrane adhering thereto. I have found that it is very difficult to handle such sticky mass and to properly prepare the same for grinding to make poultry feed. If the damp or wet material is placed in a grinding machine the shells will adhere to the machine and quickly clog the same. If they are placed in an ordinary drying machine similar results are obtained in that the shell particles will adhere to the casing of the machine and to any stirrers or movable parts therein.

In accordance with the present invention I provide a suitable apparatus for properly preparing egg shells so that they may be conveniently ground for use in poultry feed or the like.

The objects of this invention are to provide a new method for treatment for cooking and drying egg shells; to provide suitable apparatus for carrying out such method; to provide a novel cooker and drier for cooking and drying egg shells or other similar materials; to provide a cooking and drying apparatus whereby the material to be acted upon will first be subjected to the action of steam at relatively high temperature and will then be dried; and to provide such other advantages in operation and improvements in construction as will appear more fully from the following description.

In the accompanying drawings illustrating this invention:

Figure 1 is a longitudinal sectional view of the cooker and drier taken on line 1—1 of Figure 2; and Figure 2 is an end view of the same, parts being broken away for convenience in illustration.

The machine shown in these drawings is in general of a type more or less commonly used for drying or melting but with certain modifications and attachments necessary for the carrying out of my improved process. As shown in these drawings the drum 5 which is mounted in any suitable manner, is provided with a steam jacket 6. A shaft 7 projects through the drum and is provided with suitable mixing blades or stirring devices 8. The shaft 7 is driven by any suitable means such as the gearing shown. A steam supply pipe 9 leads from any suitable source of steam supply and has one branch 10 leading into one end of the drum and another branch 11 leading into the opposite end of the drum, this double inlet being for the purpose of quickly admitting steam into the drum. The pipe 9 has a control valve 12.

The material is fed into the drum through a dome or feed inlet 13 which is provided with a tight cover 14. It is discharged or removed from the drum through a discharge gate or door 15 which is provided with the usual means for making a tight closure and holding it against pressure. A drain pipe 16 is arranged at the bottom of the drum and is provided with a valve 17.

It is desired to permit the steam and vapor to be discharged from the drum as rapidly as possible and for this reason a comparatively large discharge pipe 18 leads from the drum 13 to the atmosphere, this discharge being controlled by a valve 19. If this large valve were opened when there was too much pressure in the drum or tank 5, the shells or other material might be discharged therethrough, being carried out by the steam. In order to gradually reduce the pressure I provide a by-pass 20 around the valve 19, this by-pass being made of relatively small pipe and being provided with a valve 21 for controlling the same.

Steam from any suitable source of supply is carried to the jacket 6 through a supply pipe 22 having one branch 23 leading to one end of the jacket and another branch 24 leading to the opposite end. This steam supply is controlled by a valve 25. The pressure in the jacket is indicated by a gauge 26 and the pressure in the drum by a gauge 27. Any water or condensed steam in the jacket may be discharged through the discharge pipe 28 in the usual manner.

In the operation of the machine and in carrying out my method, a batch of broken egg shells which are wet with egg albumen are emptied into the cooker and the cover closed. In the meantime the shaft 7 with beaters thereon is in operation and tends to keep the material stirred as it enters the drum. The jacket is supplied with steam at any desired pressure preferably about forty pounds. As soon as the cover is closed steam is turned into the drum at about thirty-five or forty pounds pressure and maintained therein about twenty-five minutes or until the albumen and membrane are cooked. The cooking is tested by the test valve 17 which is opened to allow the condensed steam with any liquid albumen to be discharged and when liquid ceases to run from the test valve it indicates that the material has been sufficiently cooked. The steam is then shut off from the drum or inside of the cooker and the by-pass 20 is opened until the internal pressure is reduced to approximately atmospheric pressure. The large valve 19 is then opened and moisture, steam or vapor will continue to be discharged until the shells are sufficiently dried. When they are dried sufficiently to be ground or crushed they may still contain approximately 8 to 10 per cent of moisture which will not be objectionable. One of the particularly essential steps in the method is the cooking of the whites of the eggs with comparatively wet steam as quickly as possible in order to keep the shells from sticking to any parts of the cooker. When the shells have been sufficiently dried the door 15 is opened and the contents discharged preparatory for the next batch.

I have found that by means of such apparatus large quantites of broken egg shells may be rapidly and economically dried preparatory for crushing or grinding. Such ground shells are recognized as being desirable for poultry feed and may be satisfactorily prepared by my method or treatment.

Having thus described my invention which however I do not wish to limit to the exact construction or particular method herein shown and described, except as specified in the following claims, what I claim and desire to secure by Letters Patent is:

1. The herein described method of treating egg shells having a residue of albumen in its original condition remaining thereon, which consists in subjecting the same in a closed vessel to steam of approximately thirty-seven pounds per square inch pressure for about twenty-five minutes to coagulate the albumen and then turning off the steam and opening the vessel and subjecting the material to a drying heat until sufficiently dried.

2. The method of treating egg shells having a residue of albumen adhering thereto which consists in placing the same in a container, subjecting them to stirring in the container and subjecting them to the action of wet steam of approximately thirty-five pounds pressure per square inch while in the container until the albumen adhering to the shells is cooked and finally drying the shells and such cooked material.

3. The method of preparing egg shells having wet membrane and albumen adhering thereto, for use in poultry feed, which consists in cooking the same with steam in a closed drum and simultaneously stirring the mass until the membrane and albumenous material is cooked and finally drying the mass.

4. The art of treating relatively large quantities of egg shells having wet albuminous material adhering thereto which consists in putting a batch thereof into a closed steam heated cooker having stirring devices therein, stirring the shells as they are being introduced into the cooker by means of said devices and continuing the stirring throughout the operation, then turning steam into the cooker at a pressure sufficient to cook the albumen and keeping the batch in the cooker and stirring the same until the albumen is cooked, then shutting off the steam from the cooker, and allowing the steam in the cooker to escape therefrom gradually until the pressure in the cooker is reduced to atmospheric pressure, then opening a large orifice in the cooker to permit the moisture, steam and vapor to escape until the shells are dry, and finally removing the shells from the cooker.

5. A new and useful art comprising the preparation of a mass of egg shells with substantially all of the contents of the eggs separated therefrom which consists in placing the mass in a heated receptacle and agitating the same as they are placed therein, then closing the receptacle and injecting steam at sufficient temperature to cook any albumen or membrane in the mass as it is being agitated, testing the degree of cooking by withdrawing any condensed steam and liquid albumen which may be present until liquid ceases to run from the receptacle; then shutting off the steam from the receptacle and drawing the steam off gradually until the pressure is reduced to approximately atmospheric pressure, then opening a large outlet in the receptacle to permit the rapid discharge of moisture, steam or vapor until the shells are sufficiently dried and finally withdrawing the shells from the receptacle.

6. The herein described method of preparing egg shells having substantially all of the contents separated therefrom but with some albumen and membrane remaining therewith, which consists in placing a quantity of such shells gradually in a heated drum, agitating the same as they are introduced into the drum and until the process is completed, subjecting the shells to steam under pressure at sufficiently high temperature to cook the albumen and the like, and finally in driving off the excess moisture after the albumen has been sufficiently cooked.

CARL O. RYDE.